United States Patent

[11] 3,584,260

[72] Inventor Spartacus Barbini
Chaville, France

[21] Appl. No 797,533
[22] Filed Feb. 7, 1969
[45] Patented June 8, 1971
[73] Assignee Compagnie Generale D'Electricite
Paris, France
[32] Priority Feb. 7, 1968
[33] France
[31] 139,027

[54] LIGHTNING ARRESTER AND ARRESTER-TRIGGERING SYSTEM
13 Claims, 6 Drawing Figs.

[52] U.S. Cl. .......... 317/61, 307/149, 317/69, 317/74
[51] Int. Cl. .......... H01j 7/44, H01j 13/46
[50] Field of Search .......... 317/61, 69, 73, 74, 76, 61.5, 16, 79, 16; 331/94.5; 307/149

[56] References Cited

UNITED STATES PATENTS

| | | | |
|---|---|---|---|
| 3,215,997 | 11/1965 | Leavitt et al. .......... | 307/149 |
| 3,275,891 | 9/1966 | Swanson .......... | 317/16 |
| 3,309,575 | 3/1967 | Lee et al. .......... | 317/61.5 |
| 3,489,949 | 1/1970 | Carpenter .......... | 317/69 |

FOREIGN PATENTS

| | | | |
|---|---|---|---|
| 1,381,480 | 11/1964 | France .......... | 317/16 |

*Primary Examiner*—D. F. Duggan
*Assistant Examiner*—U. Weldon
*Attorney*—Sughrue, Rothwell, Mion, Zinn & Macpeak

ABSTRACT: A lightning arrester including a laser for triggering the arrester upon the arrival of a line disturbance which itself is signalled by various conventional detectors and/or by radio or optical detectors which signal the descent or probability of descent of lightning onto the transmission line.

LIGHTNING ARRESTER AND ARRESTER-TRIGGERING SYSTEM

BACKGROUND OF THE INVENTION

1. Field of the Invention

The present invention relates to electrical transmission lines which carry electrical energy at high and very high voltage, and the protection equipment for these lines, and more particularly to equipment which is intended to discharge high voltage to the ground or into a load.

2. Description of the Prior Art

The protection of equipment against high voltage surges in stations along high voltage transmission is a problem which has been very difficult to resolve. Studies have shown that it is absolutely essential to prevent, at any cost, the arrival of a voltage surge due to lightning, for instance, over a certain length of line occurring in the immediate neighborhood of a central station, substation or other equipment of this type. Investigations have shown, for example, that in the case of a 380 -k line which involves buried transformers connected to the line by cables of a length of about 100 meters, it is necessary to protect the line over a length on the order of 1200 meters from the transformer or from the central station. In addition, it has been shown that for a line length of about 800 meters from the central station or from the transformer, it is necessary to provide protection against a direct lightning stroke. Obviously, for satisfactory operation the protection device must act very rapidly because, if a stroke of lightning occurs in the neighborhood of a central station (for example at a distance of 1200 meters therefrom) there is produced a shock wave which reaches the central station in a time of less than 5 microseconds. This excludes the use of circuit breakers whose triggering time is distinctly longer than 5 microseconds.

The protection of transmission lines against surges of this type is generally achieved by means of lightning arresters which are assemblies comprised of one or more spark gaps formed by spaced electrodes of particular configuration, the spark gaps being connected in series or in parallel and associated or combined with resistors. At the arrival of shock waves due to lightning (or any other cause), of which the voltage is higher than the striking voltage of the spark gaps, an arc is struck between the electrodes of the lightning arrester and the transmission line is momentarily grounded. When the surge is discharged, it is necessary to extinguish the arc at the spark gaps in order to prevent the line from discharging into the ground and in order to restore normal operation.

The protection level of a lightning arrester is determined by the striking voltage and by the residual voltage; that is the voltage across the terminals of the lightning arrester when it is traversed by an electrical current. Generally speaking, the residual voltage is higher than the striking voltage whereby the level of protection is decreased. In order to increase the protection it is therefore necessary to improve the operating characteristics of the spark gaps by reducing the striking time, or by controlling the value of the striking voltage. On the other hand, the residual voltage may be reduced by improving the extinguishing power of the lightning arrester.

The present invention is based upon the application of electromagnetic means having high energy density, for example, laser beams to the spark gaps of the lightning arrester for firing of the same.

The firing of high voltage spark gaps by electromagnetic means of high energy density involves an entirely different phenomena and has formed the subject matter of a series of French patents, more particularly French Pat. Nos. 1,387,087, 1,381,470 and 1,381,480, filed Oct. 28, 1963, and assigned to a common assignee.

In an article published in May, 1963, in the journal "IBM Technical Disclosure Bulletin," Anderson describes a method of obtaining a preferential path for an electric arc passing through a gaseous medium. Anderson discovered that, in the case of a readily ionizable gaseous media (caesium vapor) the passage of a high-power light beam causes local heating of the gaseous medium and ionization of the latter. Anderson utilized the phenomena for stabilizing an electric arc by passing a laser beam through the space situated between parallel plates (the beam passing through an aperture in one of the plates). Thus, an electric arc was obtained between the plates when brought to an appropriate potential, was substantially rectilinear, stable and followed the laser beam.

Anderson's idea was employed by Perry in a patent applied for in the name of Allis Chalmers Company (French Pat. No. 1,480,034, which was applied for in France based on a U.S. priority application, Ser. No. 456,793, filed May 18, 1965 in the United States). Perry proposed to provide a device for guiding an electric arc in order to obtain a discharge between a transmission line and the ground at a well-determined point following the shortest and most stable possible path. In order to do this, Perry utilizes two plates, one of which is connected to the line, and the other to ground, the plates being disposed from each other a distance on the order of 2 to 4 meters. It is known that under these conditions, the discharge of the arc is not rectilinear but follows a random, broken line, the length of which may reach 5 to 6 meters.

In order to stabilize the arc in such a device, Perry adopted Anderson's idea of using a laser beam which will cause the arc to follow a rectilinear path by reason of the ionization of the air which is heated in the path of the laser beam. Such a use of a laser beam also has the advantage of fixing the points of attachment of the electric arc to the plates, these points of attachment having a position which cannot normally be preset. Perry proposed on the one hand to use a continuously operating laser and on the other hand a pulsed laser, i.e., one in which the light beam is modulated in synchronism with the voltage or the current of the transmission line. According to Perry, the laser is "fired" by any predetermined signal, for example when the current of the transmission line exceeds a predetermined value.

Although somewhat briefly described, Perry's apparatus appears capable of achieving the object at which it was aimed as defined by Anderson, namely, the stabilization and guiding of an electric arc struck between two conductors which are disposed at relatively great distances from each other. However, such an apparatus as Perry's, is quite unsuitable for the protection of transmission lines because it cannot satisfy the particular characteristics required of such protective devices. The stability of the electric arc and its length are not the most important aspects which influence the operation of protector devices such as lightning arresters, of which Perry's apparatus is only a primary image. On the other hand, in lightning arresters, it is of primary importance to have an arc of a certain length because, once the surge has passed, the arc must be extinguished as rapidly as possible preferably before the passage of the line voltage through zero. In lightning arresters intended for high voltage lines, efforts are made to incorporate means for blowing out the arc, for example, by magnetic blowing of the same, the effect of which is precisely to lengthen the arc. One example of such blowing means is described in detail in the journal "ASEA Revue," No. 1, 1962, pages 3 to 7.

SUMMARY OF THE INVENTION

The present invention has for its object, to improve the response time to a transmission line-protecting device, to control at will, the triggering voltage of the device, to reduce the residual voltage thereof and to improve the extinction therein.

The present invention improves the operation of lightning arresters by providing, in association therewith, a device for firing the spark gaps, by means of which, it is possible to bring about the firing exactly at the required instant for any value of voltage above the rate of voltage of the line. It is not only possible to control the instant of firing of the lightning arrester, but it is also possible to vary the firing voltage without having to act on the mechanical elements of the arrester.

While known lightning arresters are designed for a given operating voltage, the lightning arrester according to the present invention may operate over a much wider voltage range. The present invention improves the protection level of lightning arresters and changes them into an active element which is in the inoperative state when no surge is signalled to the line but which is automatically rendered operative, i.c., ready to be fired under conditions when there is probability of occurrence of a surge or when a surge has actually been detected over any portion of the line.

The present invention relates to an installation for the protection against surges due to lightning of a transmission line carrying electrical energy at high voltage. The invention comprises a lightning arrester including a plurality of spark gaps, a laser generator so arranged as to send a laser beam into the interelectrode space of at least one spark gap and a circuit for controlling the triggering of the spark gap by action on the part of the laser. The invention is characterized by the control circuit comprising at least one detector which is sensitive to electrical and electromagnetic disturbances created by storms which produces the preionization of at least one of the spark gaps.

DESCRIPTION OF THE PREFERRED EMBODIMENTS

Figure 1:
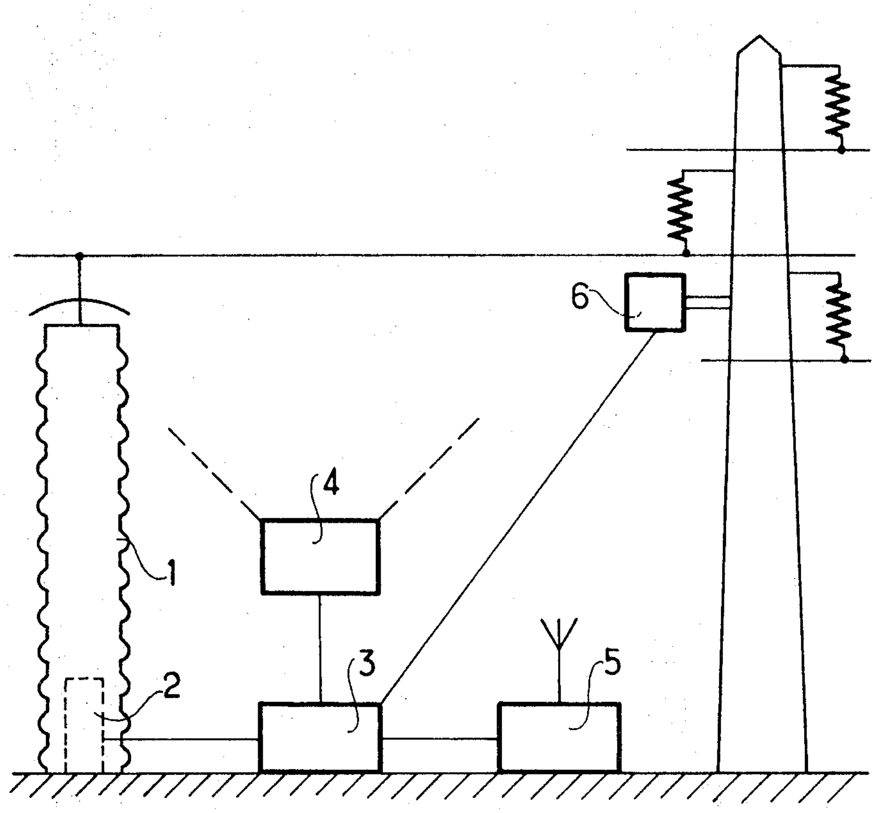
FIG. 1 is a diagrammatic view of a complete high voltage installation according to the present invention.

The complete installation according to the invention, as diagrammatically illustrated in FIG. 1, comprises a lightning arrester 1 distinguished notably by the fact that it comprises at least one spark gap provided with an arc-striking device in the form of a laser 2. This lighting arrester may be an arrester of the conventional type which normally comprises no arc-striking device, but is so modified as to permit the passage of a laser beam through at least a part of the interelectrode space of a spark gap or so constructed as to enable at least one electrode or counterelectrode of the spark gap to be acted on by a laser beam. Obviously, an installation according to the invention may comprise a lightning arrester of novel design as hereinafter defined by the description of a number of embodiments.

The installation according to the invention includes in addition, a control circuit 3 for the laser 2, which may comprise, on the one hand, the electronic equipment and the energy-supply equipment necessary for the operation of the laser, and on the other hand, data-processing circuits necessary for controlling the operation of the laser as a function of the signals received from external control circuits or from different detecting means forming part of the installation.

The installation according to the invention comprises at least one detector capable of signalling the real or probable existence of an overcurrent or of an overvoltage along the transmission line to be protected, or the arrival of a shock wave at this line. Depending upon the circumstances, the detector may also comprise measuring devices which give the characteristics of the disturbance existing along the line. The information given by the detector or detectors of the installation is processed by the data-processing circuit, which will bring the lightning arrester into the most favorable condition for suppressing the disturbance in the line.

The detectors forming part of the installation according to the invention may be of very different types.

A first type of detector employed in the invention is a photoelectric detector 4 capable of detecting the existence of flashes in the sky in proximity to the station to be protected or in proximity to the installation of the lightning arrester itself.

By way of example, when a station is installed in a valley close to mountains, the photoelectric detectors may be installed in these mountains, while the installation of the lightning arrester according to the invention may be close to the station. A photoelectric detector will therefore have the object of signalling to the installation of the lightning arrester the probable arrival of a disturbance due to lightning.

Another detector which may perform a similar function may consist of a radio receiver 5 having particular characteristics, which is sensitive to parasitic hertzian waves created by lightning striking in proximity thereto. Such a device is disclosed, for example, in French Pat. No. 1,485,939 or in U.S. Pat. No. 3,215,997.

In accordance with the present invention, the installation may also comprise detectors 6 capable of signalling and measuring the characteristics of the overcurrents or overvoltages actually existing along the line. These detectors may be installed at some distance from the installation of the lightning arrester according to the invention, so that the data-processing circuit can not only be informed of the arrival of a shock wave, but can also calculate with accuracy the instant of arrival of this shock wave at the point of the line at which the lightning arrester is installed. The detectors employed in the installation according to the invention may be of any known type, for example electromagnetic, electrostatic, magneto-optical or electro-optical, or even conventional instrument transformers.

Depending upon their type, these detectors may be mounted on the ground, on posts, on the pylons of the line or on the line itself.

The laser employed in the installation according to the invention may be of any type. More particularly, it may be a triggered laser emitting a pulse of short duration and of relatively high energy. The laser may also be a laser having relaxed or continuous operation, more particularly, a gas laser. The laser employed may in addition comprise any device for modulating the power of the emitted beam.

By way of example, there may be employed a continuously operating laser which is triggered immediately when one of the detectors signals the possibility or the probability of the arrival of a disturbance at the line.

The light beam may be so controlled as to produce, in the lightning arrester, a preionization which will be incapable of striking the electric arc, but which will improve the operation of the lightning arrester in the event of the arrival of a shock wave which has not been signalled by one of the detectors, for example one which has become defective. Normally, the arrival of the shock wave, signalled by the detector, may so control the device for modulating the laser beam as to increase suddenly the intensity of the beam and where necessary so as to be able to strike the arc a few instants before the arrival of the shock wave at the arrester.

By increasing the intensity of the continuously operating laser beam, it is also possible to improve the characteristics of the electric arc in the spark gap and to obtain a better flow of the main part of the shock wave.

Figure 2:
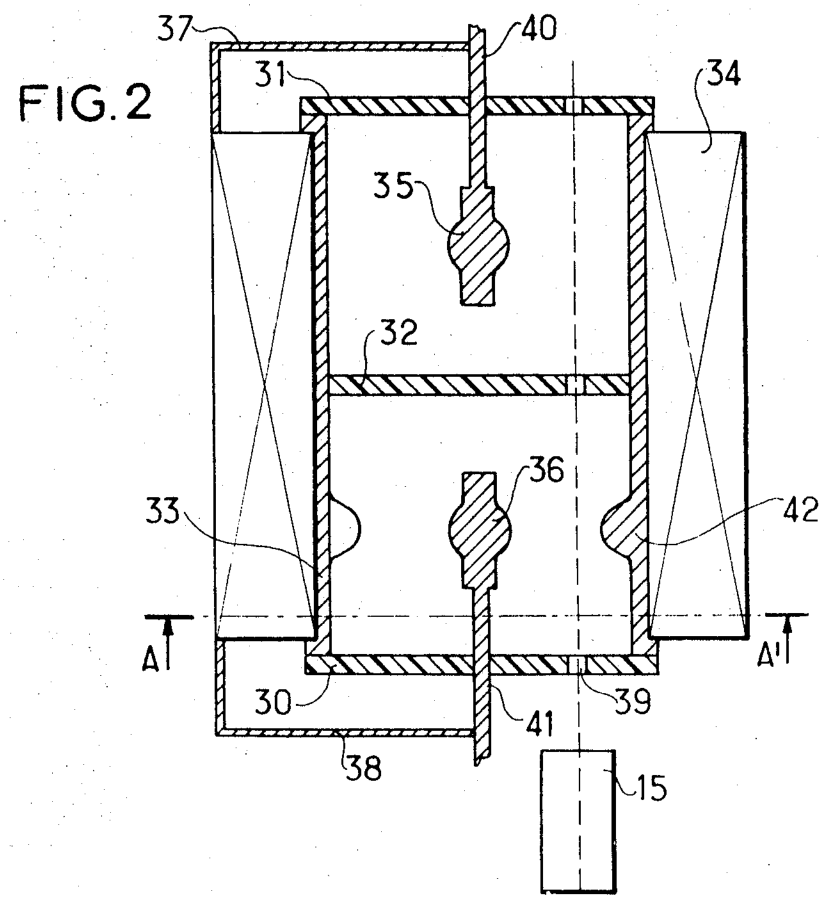
FIG. 2 is a fragmentary, diagrammatic, sectional view of one form of construction of a lightning arrester according to the present invention.

In accordance with the present invention, in FIG. 2 the laser 15 will be triggered at an instant which is well determined as a function of the characteristics of the shock wave to be eliminated and also as a function of the protection which must be afforded to the line.

The laser may be triggered before the arrival of the shock wave, whereby the degree of protection of the line is increased. The laser may also be triggered at the arrival of the shock wave only if the value of the latter exceeds a predetermined value. The arrester assembly may be enclosed in a hermetic chamber containing a dielectric gas under pressure, for example nitrogen, helium, air or sulfur hexafluoride ($SF_6$).

Hence, by modifying the various parameters such as, for example, the instant of the laser pulse, the duration of the laser pulse, the energy of this pulse, the nature of the dielectric gas, the pressure of this gas and the proximity of the laser beam to either electrode, it is possible to modify the characteristics of the arrester without having to change any mechanical part.

It is therefore possible to manufacture a single lightning arrester which may be employed for a wide voltage range by modifying only the parameters as defined in the foregoing.

In accordance with a particular embodiment, a lightning arrester according to the invention may be formed by the assemblage of a plurality of prefabricated elements such as that illustrated in FIG. 2, which comprises a single common tubular electrode 33 enclosing two internal electrodes 35 and 36 separated by a fluidtight insulating partition 32. The external tubular electrode 33 comprises a single coil 34 connected in parallel with a resistor in series with the arrester. The arrester element itself may also be employed as a resistor by connecting the coil 34 in parallel with the element itself by means of the conductors 37 and 38 illustrated in FIG. 2.

If necessary, the rods 40 and 41 supporting the electrodes 35 and 36 may be made of a material which exhibits a certain electrical resistance which will add a potential drop to that produced by the electric arcs themselves.

Finally, the cell comprises two fluidtight insulating covers 30 and 31 which, like the partition 32, are formed with fluidtight transparent windows such as 39 which allow the passage of the laser beam. These windows 39 may comprise optical devices for focusing the laser ray within each of the chambers of the spark gap. The insulating ducts necessary for the supply of dielectric gases are not shown in the figure.

In accordance with another embodiment of the invention, the internal partition of the tubular electrode 33 may comprise, in at least one of the chambers of the element, at least one central projecting portion such as 42 which defines a narrower passage in relation to the internal electrode 36, whereby the firing of the spark gap may be favored. This part 42 may be formed of an annular boss or of a series of bosses or protuberances disposed along a circumference of the internal surface of the electrode 33.

Figure 3:
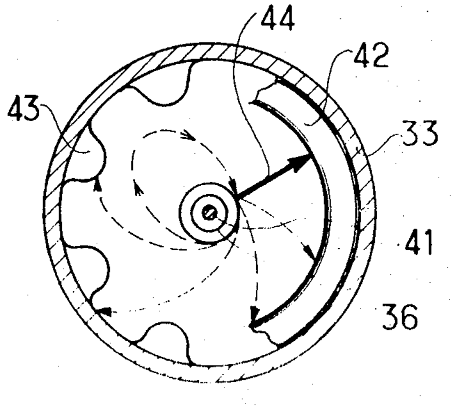
FIG. 3 is a sectional view of the lightning arrester of FIG. 2 taken about lines A–A′.

FIG. 3 illustrates the spark gap element in section along the plane A–A'. It is to be noted that the annular boss 42 may cover only a portion of a circumference of the internal surface of the electrode 33, the other portion of this circumference comprising a series of protuberances such as 43.

It will be assumed that the laser beam causes the striking of an arc such as 44. The laser beam may be disposed either on the side of the boss 42 or on the side of the boss 43. On the side of the boss 43, the peak effect would favor the striking itself. The device of the laser beam on the side of the boss 42, however, may permit of obtaining a more stable and more intense arc which favors a better flow of the current at the beginning of the shock wave.

The magnetic field, perpendicular to the plane of FIG. 3, produced by a coil such as 34 will have the effect of deflecting the arc so as to displace its seat on the internal surface of the electrode 33, as illustrated in chain lines in FIG. 3. At the limit, and with a sufficiently strong magnetic field, the electric arc is closed on itself, whereby it is extinguished.

It will be seen that in this case the combination of a boss such as 42 with bosses 43 can only favor the extinction of the arc of the spark gap.

Finally, in accordance with another embodiment of the invention (not illustrated in the figures), the arrester element may comprise an arc-blowing device operating with a jet of dielectric gas, which would be sent, for example, by the internal electrode whose portions 36 and 41 would be hollow in order to permit the supply of gas.

Figure 4:
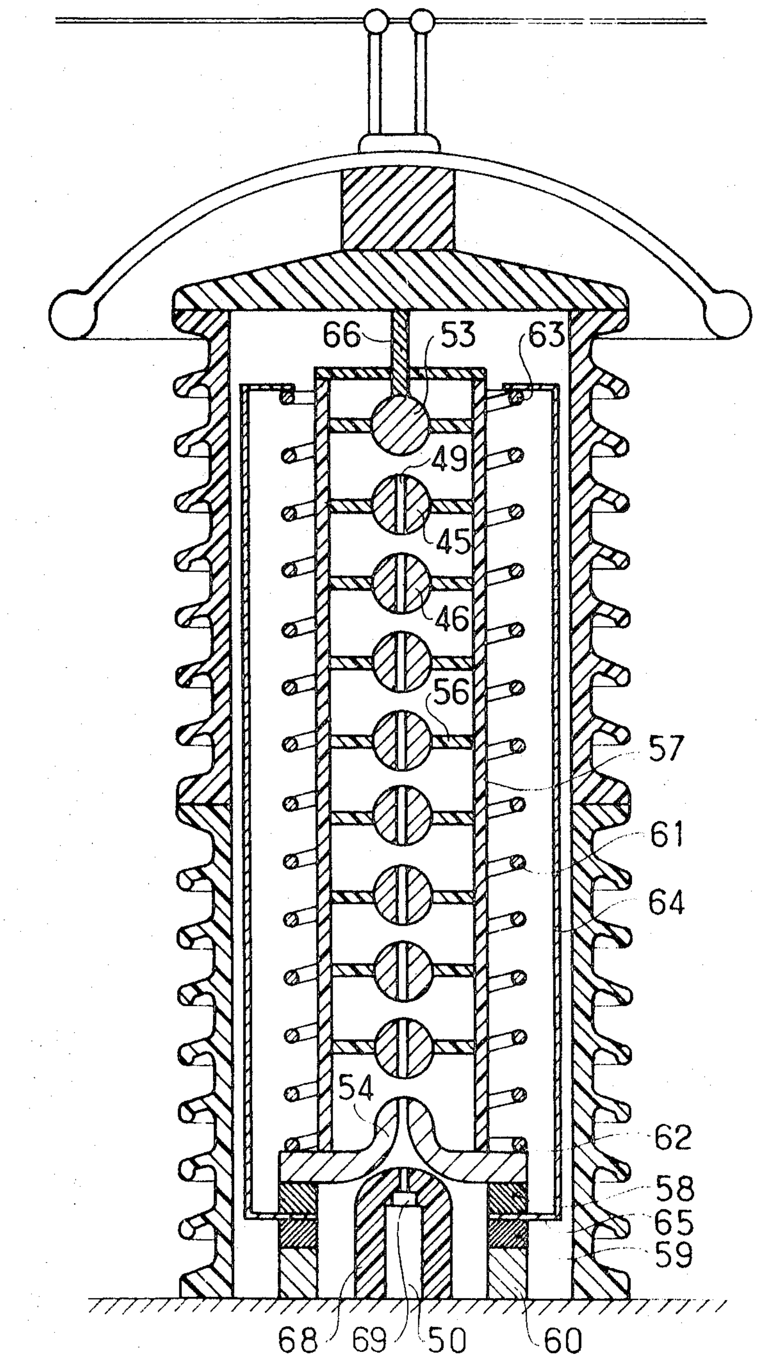
FIGS. 4 and 5 are diagrammatic sectional views of two other embodiments of a lightning arrester according to the present invention.
Figure 5:
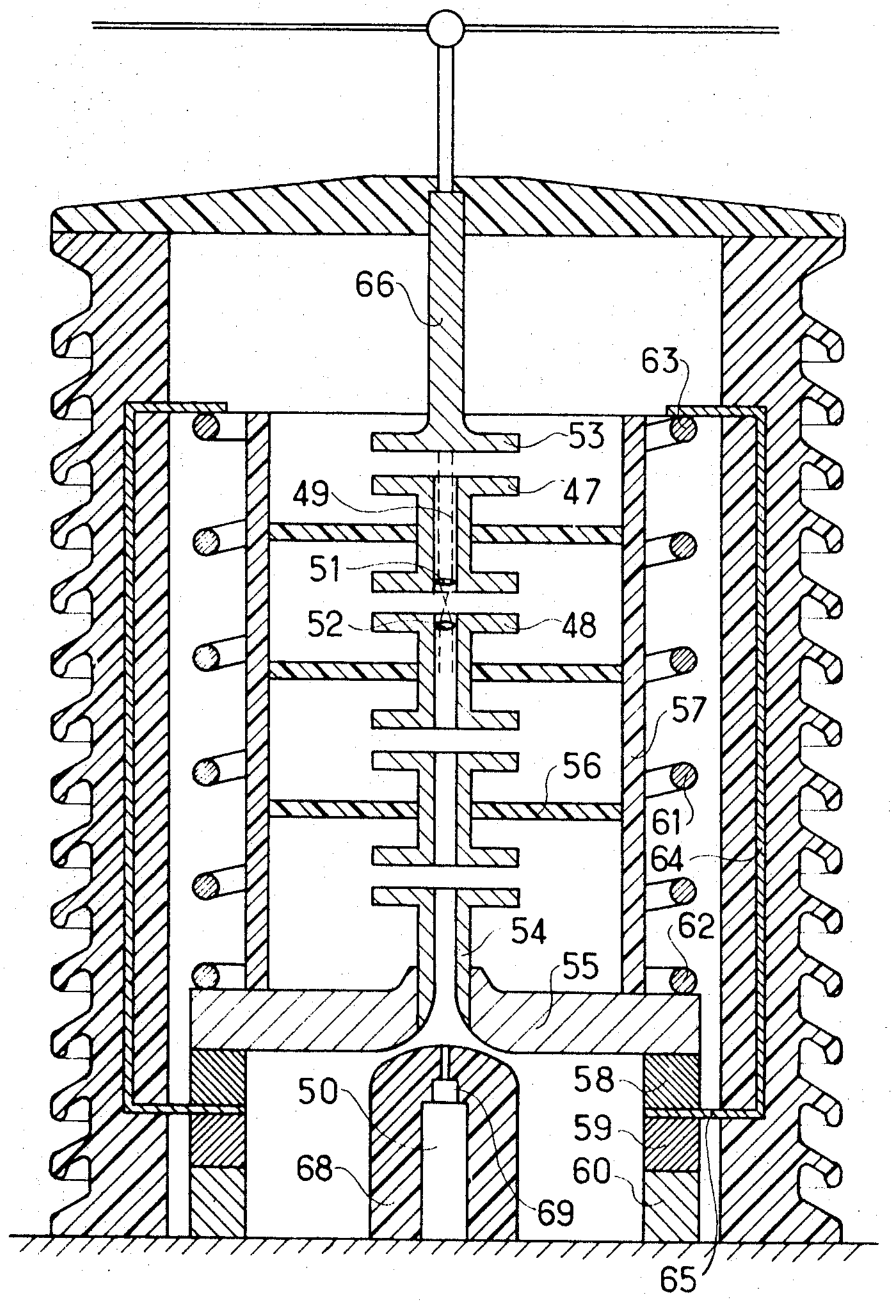
Figure 6:
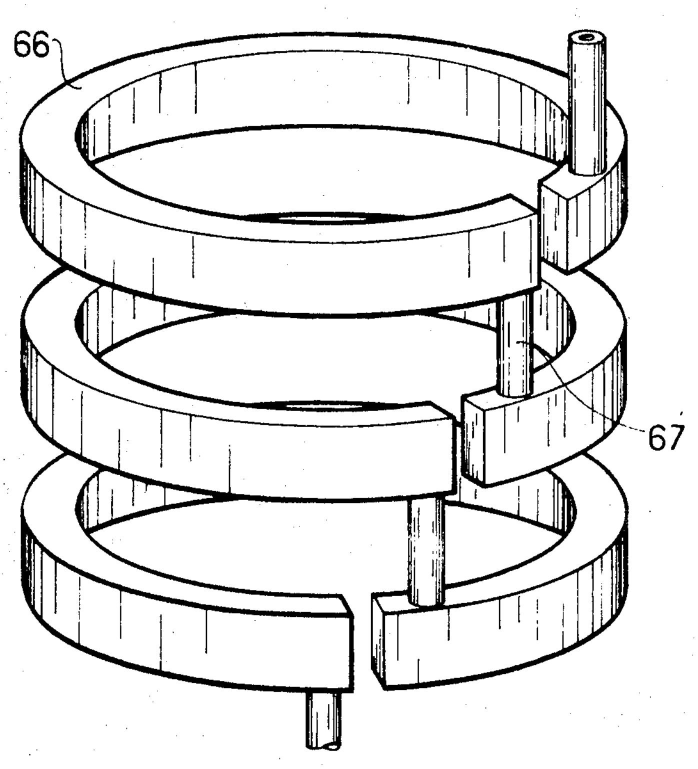
FIG. 6 is a perspective view of a winding which may be integrated into a lightning arrester in accordance with the present invention.

FIGS. 4 to 6 illustrate other embodiments of a lightning arrester according to the invention, these embodiments having in common the fact that the extinction of the arc is not obtained by the action of a magnetic field perpendicular to the electric arc of the spark gap, but by the action of a magnetic field parallel to this arc, such a circulation of the magnetic field producing, not a lengthening of this arc, but a striction.

In the embodiments illustrated in FIGS. 4 and 5, the lightning arrester comprises a series of spark gaps formed of electrodes of substantially spherical or ovoidal form (such as the electrodes 45—46 of FIG. 4) or substantially flat electrodes (such as the electrodes 47—48 of FIG. 5) formed with a central aperture 49 to allow the passage of the beam of a laser 50 disposed at the bottom of the column. Like parts have like numeral designations. Each of these electrodes may if necessary comprise an optical device formed of lenses for focusing the laser beam in the interelectrode space.

Such an optical device is shown only in FIG. 5, in which it is denoted by 51—52, but it is obvious that it may equally well be disposed in one or more of the spark gaps illustrated in the other figures.

The lightning arresters of FIGS. 4 and 5 may comprise an upper electrode 53 having no central aperture, on which the laser beam impinges.

The form of the lower electrode 54 is adapted to the other electrodes of the same spark gap. It may be made in one piece (FIG. 4) or it may comprise an additional part 55 in the form of a plate (FIG. 5), each of the electrodes such as 45 or 47 being maintained in position by insulating members 56 secured to the inside surface of an insulating cylinder 57. The cylinder 57 may be maintained in position by any known means. More particularly, it may rest on the metal plate 55 forming the base of the electrode 54 of FIG. 5 or on the corresponding part of the electrode 54 of FIG. 4.

The lower electrode 54 rests on a tubular conductor which may be of circular, polygonal or any other cross-sectional form. This cylindrical conductor, of which the lower part is connected to earth, may be formed of a number of parts having different electrical conductivities.

In accordance with one embodiment, one portion of this conductor forms a series resistor, to the terminals of which there is connected a coil for producing a magnetic field which permits the extinction of the electric arc of the spark gaps.

As illustrated in FIGS. 4 and 5, this resistor may consist of an upper portion 58 of the conductor supporting the base of the electrode 54.

Another portion 59 of this conductor may be made of a material having a variable nonlinear resistivity as a function of the current flowing through it. As mentioned in the foregoing, a resistor thus constructed promotes the extinction of the continuing current of the arrester.

The lower portion of the other conductor supporting the electrode 54 may be made of a metallic material having normal electrical conductivity.

As mentioned in the foregoing, the arrester according to the invention as illustrated in FIGS. 4 and 5 may comprise a coil 61 disposed around the insulating cylinder 57 enclosing the spark gap column. One end 62 of this coil is electrically connected to the electrode 54, for example in contact with its base. The other end 63 is electrically connected to the upper part of a cylindrical conductor 64 completely surrounding the assembly comprising the spark gap column and the coil 61.

The lower part of the metallic cylinder 64 is connected to the conductor supporting the electrode 54 on the lower side of the resistor 58. This connection may be made by means of a plate 65 disposed or welded between the resistor 58 and the nonlinear resistor 59. With this arrangement, the coil 61 is connected in parallel with the resistor 58. This resistor 58 allows the passage of the rising edge of the shock wave absorbed by the arrester, while the coil 61 starts to conduct the derived current only during the passage of the trailing edge of this shock wave and during the passage of the continuing current. The magnetic field created by the coil 61, in parallel with the electric arcs struck between the electrodes of the spark gaps, produces a striction effect on these arcs, which thus promotes their extinction. The cylindrical form of the conductor 61 favors a good flow of the current through the coil and also has the advantage of forming a Faraday screen, thus reducing the radio interference created by the operation of the spark gaps.

The conductor 64 may be embedded in the mass of the insulator surrounding the arrester (FIG. 5) or it may be disposed within this insulating mass (FIG. 4).

Finally, it is to be noted that the insulating members 56 which support the electrodes may be formed of insulating walls defining within the cylinder 57 fluidtight chambers, each of which encloses one spark gap. It is obvious that the electrodes such as the electrodes 45 of FIG. 9 may have a different form and may consist, for example, of two separate spherical parts or ovoids separated by a central member similar to the central part of the electrodes 47 and 48 of FIG. 5.

The optical focusing device which may be disposed within these electrodes may be replaced by a simple transparent wall. Should it be desired to obtain fluidtight chambers, these optical devices or transparent walls may be provided with means ensuring gastightness, whereby it is possible to fill each of the chambers with different gases or even with the same gas under different pressures, so that the electrical characteristics of the arrester may be varied.

The coil may be of any form. More particularly, it may comprise cooling means operating by a circulation of fluid. FIG. 6 illustrates a preferred, but nonexclusive, form of construction of such a coil, which may be formed of a series of hollow annular metal conductors connected together by metal tubes 67.

Finally, it is to be noted that the laser employed in a lightning arrester according to the invention may be protected by an insulating envelope 68 and disposed within the cylindrical conductor supporting the (FIGS. electrode of the column of spark gaps, as illustrated only by way of example in FIGS. 4 and 5.

The circuit for feeding the laser and controlling the triggering thereof may be disposed within the arrester or outside it as mentioned in the foregoing. The laser 2 (FIG. 1) and the laser 50 (FIGS. 4 and 5) may be a laser of any type, adapted to the particular conditions in each case, and optionally provided with a device for modulating the light beam, diagrammatically represented by 69 in FIGS. 4 and 5.

It is also to be noted that it is possible to reverse the order of the series-connected elements in the arrester according to the invention. More particularly, in the case of FIGS. 4 and 5, the nonlinear resistor may be a part of the conductor 66 connecting the line to the electrode 53. Likewise, the conductor 66 may perform the function of the resistor 58, in which case the terminal 63 of the coil will be directly connected to the electrode 53 and the lower part of the conductor 64 will be connected to the terminal 62 (or will remain unchanged if the portion 58 has normal or low resistivity), while the upper part of the conductor 64 will be connected to a point of the conductor 66. It is also possible to subdivide the column or the coil into a number of parts, to insert additional elements between these parts, etc.

What I claim is:

1. In a lightning protection system for a high voltage transmission line including a lightning arrester having a number of spark gaps, triggering means including a laser generator disposed to send a laser beam into the interelectrode space of at least one of said spark gaps and a circuit for controlling the triggering of the spark gaps by energization of the laser, the improvement wherein said controlling circuit comprises at least one detector sensitive to electrical and radio disturbances created by electrical storms and means responsive to detector operation for operating said laser.

2. The system as claimed in claim 1 wherein said control circuit comprises at least one detector sensitive to light emitted by the lightning for creating a control signal for triggering of said laser.

3. The system as claimed in claim 2, wherein said controlling circuit further comprises computing means connected to said detector for computing the probable time of arrival of the shock wave at the lightning arrester, and a delay element operatively coupled to said detector and said triggering means and responsive to computer operation for delaying the control signal transmitted from said detector to said laser operating means.

4. The system as claimed in claim 3 wherein said means for operating said laser comprises a device for modulating the intensity of the laser, said device being operatively coupled to said delay means.

5. The system as claimed in claim 3 wherein said means for operating said laser includes means for deflecting the light beam of said laser to control triggering of the arrester and means for operatively coupling said delay means to said device.

6. The system as claimed in claim 1 wherein said arrester comprises at least one double spark gap in the form of two series-connected coaxial spark gaps and a coil surrounding said series connected coaxial spark gaps and connected in series therewith to create an axial magnetic field perpendicular to the electric arc.

7. The system as claimed in claim 6 wherein at least one of said coaxial spark gaps is formed by a central electrode and a cylindrical electrode surrounding the same with the inside surface of said cylindrical electrode comprising a plurality of protuberances facilitating the extinction of the arc.

8. The system as claimed in claim 1 wherein said lightning arrester comprises a column of axially disposed spark gaps formed of spaced, aligned electrodes each having an axial aperture allowing the passage of the laser beam, an insulating column, said column of axially aligned spark gaps being supported within said insulating column by insulating support means coupled to the intermediate electrode, a coil surrounding said insulating column for the creation of an axial magnetic field, a metal wall surrounding said coil and acting as a screening conductor with the lower part connected to ground and the upper part connected to the lower electrode of the column of spark gaps through said coil.

9. The system as claimed in claim 8 further comprising resistor means connecting said lower electrode to ground and constituting a pedestal on which the arrester rests.

10. The system as claimed in claim 9 wherein the lower part of said metal wall is connected to ground through at least a portion of said pedestal.

11. The system as claimed in claim 9 wherein said pedestal includes a hollow central portion forming a seat for said laser.

12. The system as claimed in claim 8 further comprising means carried by said electrodes for focusing the laser beam in at least one of the interelectrode spaces.

13. The system as claimed in claim 8 wherein said coil acts to circulate cooling fluid and is formed of a plurality of hollow conductors as portions of the circle, connected together by hollow conductors extending parallel to the axis of the coil thus formed with ends coupled respectively to said plurality of hollow conductors of circular form.